United States Patent
Lemire et al.

(10) Patent No.: US 10,158,701 B2
(45) Date of Patent: Dec. 18, 2018

(54) METHOD AND SYSTEM FOR PROVIDING A STATE MODEL OF AN APPLICATION PROGRAM

(71) Applicant: Calgary Scientific Inc., Calgary (CA)

(72) Inventors: Pierre Joseph Lemire, Calgary (CA); Monroe Milas Thomas, Toronto (CA); Matthew James Stephure, Calgary (CA); David Bruce McFadzean, Toronto (CA); Kevin Glen Robinson, Calgary (CA); Glen Lehmann, Cremona (CA)

(73) Assignee: Calgary Scientific Inc.., Calgary, AB (CA)

( * ) Notice: Subject to any disclaimer, the term of this patent is extended or adjusted under 35 U.S.C. 154(b) by 341 days.

(21) Appl. No.: 14/609,634

(22) Filed: Jan. 30, 2015

(65) Prior Publication Data
US 2015/0163292 A1    Jun. 11, 2015

Related U.S. Application Data

(63) Continuation of application No. 13/425,496, filed on Mar. 21, 2012, now Pat. No. 8,949,378.

(Continued)

(51) Int. Cl.
*G06F 15/16* (2006.01)
*H04L 29/08* (2006.01)
(Continued)

(52) U.S. Cl.
CPC ............... *H04L 67/10* (2013.01); *G06F 8/70* (2013.01); *G06F 9/541* (2013.01); *H04L 67/025* (2013.01); *H04L 67/141* (2013.01); *H04L 67/42* (2013.01)

(58) Field of Classification Search
CPC ....... H04L 67/025; H04L 67/10; H04L 67/42; H04L 67/141; G06F 9/541; G06F 8/70
(Continued)

(56) References Cited

U.S. PATENT DOCUMENTS

| 4,975,690 A | 12/1990 | Torres |
| 5,345,550 A | 9/1994 | Bloomfield |

(Continued)

FOREIGN PATENT DOCUMENTS

| CN | 101539932 | 9/2009 |
| CN | 101883097 | 11/2010 |

(Continued)

OTHER PUBLICATIONS

International Preliminary Report on Patentability and Written Opinion, dated May 31, 2016, received in connection International Patent Application No. PCT/US2014/064243.

(Continued)

*Primary Examiner* — Lance Leonard Barry
(74) *Attorney, Agent, or Firm* — Meunier Carlin & Curfman LLC

(57) ABSTRACT

Methods and apparatuses for enabling remote access to an application program via a computer network provided. Logical elements of the application program may be determined, from which a state model of the application program may be developed. A remote access program updates the state model in accordance with user input data received from a user interface program, generates control data in accordance with the updated state model and provides the same to the application program. The state model may be updated in accordance with application data received from the application program, application representation data in accordance with the updated state model are generated and provided to the user interface program for display at, e.g., a remote client computing device. The application program may be a legacy mainframe application to which remote access is provided without the need to modify the source code of the mainframe application.

20 Claims, 4 Drawing Sheets

Related U.S. Application Data

(60) Provisional application No. 61/487,598, filed on May 18, 2011.

(51) Int. Cl.
*G06F 8/70* (2018.01)
*G06F 9/54* (2006.01)
*H04L 29/06* (2006.01)

(58) Field of Classification Search
USPC .................................. 709/208, 219, 230
See application file for complete search history.

(56) References Cited

U.S. PATENT DOCUMENTS

| | | | |
|---|---|---|---|
| 5,491,800 A | 2/1996 | Goldsmith et al. | |
| 5,555,003 A | 9/1996 | Montgomery et al. | |
| 5,742,778 A | 4/1998 | Hao et al. | |
| 5,844,553 A | 12/1998 | Hao et al. | |
| 5,870,759 A | 2/1999 | Bauer et al. | |
| 5,903,725 A | 5/1999 | Colyer | |
| 5,909,545 A | 6/1999 | Frese, II et al. | |
| 5,920,311 A | 7/1999 | Anthias | |
| 5,978,842 A | 11/1999 | Noble et al. | |
| 6,045,048 A | 4/2000 | Wilz et al. | |
| 6,061,689 A * | 5/2000 | Chang | G06F 17/30607 |
| | | | 707/802 |
| 6,075,531 A | 6/2000 | DeStefano | |
| 6,141,698 A | 10/2000 | Krishnan et al. | |
| 6,145,098 A | 11/2000 | Nouri et al. | |
| 6,253,228 B1 | 6/2001 | Ferris et al. | |
| 6,343,313 B1 | 1/2002 | Salesky et al. | |
| 6,453,334 B1 | 9/2002 | Vinson et al. | |
| 6,453,356 B1 | 9/2002 | Sheard et al. | |
| 6,570,563 B1 | 5/2003 | Honda | |
| 6,601,233 B1 | 7/2003 | Underwood | |
| 6,792,607 B1 * | 9/2004 | Burd | G06F 17/30893 |
| | | | 707/999.102 |
| 6,918,113 B2 | 7/2005 | Patel et al. | |
| 6,938,096 B1 | 8/2005 | Greschler et al. | |
| 6,976,077 B1 | 12/2005 | Lehew et al. | |
| 7,065,568 B2 * | 6/2006 | Bracewell | G06F 9/463 |
| | | | 709/203 |
| 7,069,227 B1 | 6/2006 | Lintel, III et al. | |
| 7,073,059 B2 * | 7/2006 | Worely, Jr. | G06F 9/4812 |
| | | | 713/164 |
| 7,149,761 B2 | 12/2006 | Cooke et al. | |
| 7,167,893 B1 * | 1/2007 | Malone | G06F 17/30286 |
| | | | 707/999.102 |
| 7,174,504 B2 | 2/2007 | Tsao | |
| 7,181,686 B1 | 2/2007 | Bahrs | |
| 7,240,162 B2 | 7/2007 | de Vries | |
| 7,246,063 B2 * | 7/2007 | James | G06F 3/167 |
| | | | 704/270.1 |
| 7,320,131 B1 | 1/2008 | O'Toole, Jr. | |
| 7,343,310 B1 * | 3/2008 | Stender | G06Q 10/10 |
| | | | 705/2 |
| 7,350,151 B1 | 3/2008 | Nakajima | |
| 7,418,711 B1 | 8/2008 | Lee et al. | |
| 7,451,196 B1 | 11/2008 | de Vries et al. | |
| 7,577,751 B2 | 8/2009 | Vinson et al. | |
| 7,620,901 B2 | 11/2009 | Carpenter et al. | |
| 7,647,370 B1 | 1/2010 | Liu et al. | |
| 7,650,444 B2 * | 1/2010 | Dirstine | G06F 9/4443 |
| | | | 709/217 |
| 7,656,799 B2 | 2/2010 | Samuels et al. | |
| 7,703,024 B2 | 4/2010 | Kautzleben et al. | |
| 7,706,399 B2 | 4/2010 | Janczak | |
| 7,725,331 B2 | 5/2010 | Schurenberg et al. | |
| 7,783,568 B1 | 8/2010 | Fracchia et al. | |
| 7,802,183 B1 | 9/2010 | Essin | |
| 7,831,919 B1 * | 11/2010 | Viljoen | G06F 9/4443 |
| | | | 709/203 |
| 7,921,078 B2 | 4/2011 | McCuller | |
| 7,941,488 B2 | 5/2011 | Goodman et al. | |
| 7,966,572 B2 | 6/2011 | Matthews et al. | |
| 8,024,523 B2 | 9/2011 | de Vries et al. | |
| 8,261,345 B2 | 9/2012 | Hitomi et al. | |
| 8,356,252 B2 * | 1/2013 | Raman | G06F 9/4443 |
| | | | 715/243 |
| 8,359,591 B2 | 1/2013 | de Vries et al. | |
| 8,509,230 B2 | 8/2013 | Vinson et al. | |
| 8,527,706 B2 | 9/2013 | de Vries et al. | |
| 8,533,103 B1 | 9/2013 | Certain et al. | |
| 8,572,178 B1 | 10/2013 | Frazzini et al. | |
| 8,606,952 B2 | 12/2013 | Pasetto et al. | |
| 8,607,158 B2 | 12/2013 | Molander et al. | |
| 8,627,081 B2 | 1/2014 | Grimen et al. | |
| 8,910,112 B2 | 2/2014 | Li et al. | |
| 8,667,054 B2 | 3/2014 | Tahan | |
| 8,832,260 B2 | 9/2014 | Raja et al. | |
| 8,924,512 B2 | 12/2014 | Stoyanov et al. | |
| 9,239,812 B1 | 1/2016 | Berlin | |
| 9,686,205 B2 | 6/2017 | Leitch et al. | |
| 2001/0033299 A1 | 10/2001 | Callaway et al. | |
| 2001/0047393 A1 * | 11/2001 | Arner | G06F 9/4445 |
| | | | 709/216 |
| 2002/0032751 A1 | 3/2002 | Bharadwaj | |
| 2002/0032783 A1 | 3/2002 | Tuatini | |
| 2002/0032804 A1 | 3/2002 | Hunt | |
| 2002/0092029 A1 | 7/2002 | Smith | |
| 2003/0014735 A1 | 1/2003 | Achlioptas et al. | |
| 2003/0023670 A1 | 1/2003 | Walrath | |
| 2003/0055893 A1 | 3/2003 | Sato et al. | |
| 2003/0065738 A1 * | 4/2003 | Yang | G06F 8/65 |
| | | | 709/215 |
| 2003/0120324 A1 * | 6/2003 | Osborn | A61N 1/08 |
| | | | 607/60 |
| 2003/0120762 A1 | 6/2003 | Yepishin et al. | |
| 2003/0149941 A1 | 8/2003 | Tsao | |
| 2003/0163514 A1 | 8/2003 | Waldschmidt | |
| 2003/0184584 A1 | 10/2003 | Vachuska et al. | |
| 2003/0208472 A1 | 11/2003 | Pham | |
| 2004/0015842 A1 * | 1/2004 | Nanivadekar | G06F 8/34 |
| | | | 717/109 |
| 2004/0029638 A1 | 2/2004 | Hytcheson et al. | |
| 2004/0039742 A1 | 2/2004 | Barsness et al. | |
| 2004/0068516 A1 | 4/2004 | Lee et al. | |
| 2004/0077347 A1 * | 4/2004 | Lauber | G08G 1/0962 |
| | | | 455/428 |
| 2004/0103195 A1 | 5/2004 | Chalasani et al. | |
| 2004/0103339 A1 | 5/2004 | Chalasani et al. | |
| 2004/0106916 A1 | 6/2004 | Quaid et al. | |
| 2004/0117804 A1 | 6/2004 | Scahill et al. | |
| 2004/0162876 A1 | 8/2004 | Kohavi | |
| 2004/0183827 A1 | 9/2004 | Putterman et al. | |
| 2004/0236633 A1 | 11/2004 | Knauerhase et al. | |
| 2004/0243919 A1 | 12/2004 | Muresan et al. | |
| 2004/0249885 A1 | 12/2004 | Petropoulakis et al. | |
| 2005/0005024 A1 | 1/2005 | Samuels et al. | |
| 2005/0010871 A1 | 1/2005 | Ruthfield et al. | |
| 2005/0021687 A1 | 1/2005 | Anastassopoulos et al. | |
| 2005/0050229 A1 | 3/2005 | Comeau et al. | |
| 2005/0138631 A1 | 6/2005 | Bellotti et al. | |
| 2005/0188046 A1 | 8/2005 | Hickman et al. | |
| 2005/0188313 A1 | 8/2005 | Matthews et al. | |
| 2005/0190203 A1 * | 9/2005 | Gery | G06F 9/4443 |
| | | | 345/660 |
| 2005/0198578 A1 | 9/2005 | Agrawala et al. | |
| 2005/0216421 A1 | 9/2005 | Barry et al. | |
| 2005/0240906 A1 | 10/2005 | Kinderknecht et al. | |
| 2006/0004874 A1 | 1/2006 | Hutcheson et al. | |
| 2006/0026006 A1 | 2/2006 | Hindle | |
| 2006/0031377 A1 | 2/2006 | Ng et al. | |
| 2006/0031481 A1 | 2/2006 | Patrick et al. | |
| 2006/0036770 A1 | 2/2006 | Hosn et al. | |
| 2006/0085835 A1 | 4/2006 | Istvan et al. | |
| 2006/0101397 A1 | 5/2006 | Mercer et al. | |
| 2006/0130069 A1 | 6/2006 | Srinivasan et al. | |
| 2006/0231175 A1 | 10/2006 | Vondracek et al. | |
| 2006/0236328 A1 | 10/2006 | DeWitt | |
| 2006/0258462 A1 | 11/2006 | Cheng et al. | |
| 2006/0265689 A1 | 11/2006 | Kuznetsov et al. | |

(56) References Cited

U.S. PATENT DOCUMENTS

| | | |
|---|---|---|
| 2006/0271563 A1 | 11/2006 | Angelo et al. |
| 2006/0288171 A1 | 12/2006 | Tsien |
| 2006/0294418 A1 | 12/2006 | Fuchs |
| 2007/0024645 A1 | 2/2007 | Purcell et al. |
| 2007/0047535 A1 | 3/2007 | Varma |
| 2007/0067754 A1 | 3/2007 | Chen et al. |
| 2007/0079244 A1 | 4/2007 | Brugiolo |
| 2007/0112880 A1 | 5/2007 | Yang et al. |
| 2007/0120763 A1 | 5/2007 | De Paepe et al. |
| 2007/0130292 A1 | 6/2007 | Tzruya et al. |
| 2007/0136677 A1 | 6/2007 | Agarwal |
| 2007/0203944 A1 | 8/2007 | Batra et al. |
| 2007/0203990 A1 | 8/2007 | Townsley et al. |
| 2007/0203999 A1 | 8/2007 | Townsley et al. |
| 2007/0208718 A1 | 9/2007 | Javid et al. |
| 2007/0226636 A1 | 9/2007 | Carpenter et al. |
| 2007/0233706 A1 | 10/2007 | Farber et al. |
| 2007/0244990 A1 | 10/2007 | Wells |
| 2007/0256073 A1 | 11/2007 | Truong et al. |
| 2007/0282951 A1 | 12/2007 | Selimis et al. |
| 2008/0016155 A1 | 1/2008 | Khalatian |
| 2008/0134211 A1 | 6/2008 | Cui |
| 2008/0146194 A1 | 6/2008 | Yang et al. |
| 2008/0159175 A1 | 7/2008 | Flack |
| 2008/0183190 A1 | 7/2008 | Adcox et al. |
| 2008/0313282 A1 | 12/2008 | Warila et al. |
| 2009/0044171 A1* | 2/2009 | Avadhanula ............ G06F 8/34 717/105 |
| 2009/0080523 A1* | 3/2009 | McDowell ............ H04N 19/51 375/240.15 |
| 2009/0089742 A1 | 4/2009 | Nagulu et al. |
| 2009/0119644 A1 | 5/2009 | de Vries et al. |
| 2009/0209239 A1 | 8/2009 | Montesdeoca |
| 2009/0217177 A1 | 8/2009 | DeGrazia |
| 2009/0328032 A1 | 12/2009 | Crow et al. |
| 2010/0061238 A1 | 3/2010 | Godbole et al. |
| 2010/0077058 A1 | 3/2010 | Messer |
| 2010/0131591 A1* | 5/2010 | Thomas ................ G06F 9/52 709/203 |
| 2010/0150031 A1 | 6/2010 | Allen et al. |
| 2010/0174773 A1 | 7/2010 | Penner et al. |
| 2010/0205147 A1 | 8/2010 | Lee |
| 2010/0223566 A1 | 9/2010 | Holmes et al. |
| 2010/0223661 A1 | 9/2010 | Yang |
| 2010/0268762 A1 | 10/2010 | Pahlavan et al. |
| 2010/0268813 A1 | 10/2010 | Pahlavan et al. |
| 2011/0138016 A1 | 6/2011 | Jung et al. |
| 2011/0138283 A1 | 6/2011 | Marston |
| 2011/0145863 A1 | 6/2011 | Alsina et al. |
| 2011/0154464 A1 | 6/2011 | Agarwal et al. |
| 2011/0157196 A1 | 6/2011 | Nave et al. |
| 2011/0162062 A1 | 6/2011 | Kumar et al. |
| 2011/0184993 A1 | 7/2011 | Chawla et al. |
| 2011/0213830 A1 | 9/2011 | Lopez et al. |
| 2011/0222442 A1 | 9/2011 | Cole et al. |
| 2011/0223882 A1 | 9/2011 | Hellgren |
| 2011/0246891 A1 | 10/2011 | Schubert et al. |
| 2011/0252152 A1 | 10/2011 | Sherry et al. |
| 2011/0314093 A1 | 12/2011 | Sheu et al. |
| 2012/0030275 A1 | 2/2012 | Boller et al. |
| 2012/0084713 A1 | 4/2012 | Desai et al. |
| 2012/0090004 A1 | 4/2012 | Jeong |
| 2012/0133675 A1* | 5/2012 | McDowell ............ H04N 19/51 345/629 |
| 2012/0151373 A1 | 6/2012 | Kominac et al. |
| 2012/0154633 A1 | 6/2012 | Rodriguez |
| 2012/0221792 A1 | 8/2012 | de Vries et al. |
| 2012/0226742 A1 | 9/2012 | Momchilov et al. |
| 2012/0245918 A1 | 9/2012 | Overton et al. |
| 2012/0246225 A1* | 9/2012 | Lemire ................ G06F 8/70 709/203 |
| 2012/0324032 A1 | 12/2012 | Chan |
| 2012/0324358 A1 | 12/2012 | Jooste |
| 2013/0007227 A1 | 1/2013 | Hitomi et al. |
| 2013/0013671 A1 | 1/2013 | Relan et al. |
| 2013/0031618 A1 | 1/2013 | Momchilov |
| 2013/0046815 A1 | 2/2013 | Thomas et al. |
| 2013/0046816 A1 | 2/2013 | Thomas et al. |
| 2013/0054679 A1 | 2/2013 | Jooste |
| 2013/0070740 A1 | 3/2013 | Yovin |
| 2013/0086156 A1 | 4/2013 | McFadzean et al. |
| 2013/0086652 A1 | 4/2013 | Kavantzas et al. |
| 2013/0110895 A1* | 5/2013 | Valentino ............ G06F 7/588 708/255 |
| 2013/0113833 A1 | 5/2013 | Larsson |
| 2013/0117474 A1 | 5/2013 | Ajanovic et al. |
| 2013/0132485 A1 | 5/2013 | Thomas et al. |
| 2013/0138791 A1 | 5/2013 | Thomas et al. |
| 2013/0147845 A1 | 6/2013 | Xie et al. |
| 2013/0159062 A1 | 6/2013 | Stiehl |
| 2013/0179962 A1 | 7/2013 | Arai et al. |
| 2013/0212483 A1 | 8/2013 | Brakensiek et al. |
| 2013/0262566 A1 | 10/2013 | Stephure et al. |
| 2013/0290408 A1 | 10/2013 | Stephure et al. |
| 2013/0346482 A1 | 12/2013 | Holmes |
| 2014/0136667 A1 | 5/2014 | Gonsalves et al. |
| 2014/0240524 A1 | 8/2014 | Julia et al. |
| 2014/0298420 A1 | 10/2014 | Barton et al. |
| 2015/0067035 A1 | 3/2015 | Sullad et al. |
| 2015/0067769 A1 | 3/2015 | Barton et al. |
| 2015/0156133 A1 | 6/2015 | Leitch et al. |
| 2015/0319252 A1 | 11/2015 | Momchilov et al. |
| 2016/0054897 A1 | 2/2016 | Holmes et al. |
| 2016/0226979 A1 | 8/2016 | Lancaster et al. |

FOREIGN PATENT DOCUMENTS

| | | | |
|---|---|---|---|
| CN | 102129632 | | 7/2011 |
| CN | 102821413 | | 12/2012 |
| EP | 0349463 | | 1/1990 |
| EP | 1422901 | | 5/2004 |
| JP | 2007/084744 | | 3/1995 |
| JP | 2002/055870 | | 2/2002 |
| JP | 2004-287758 | | 10/2004 |
| JP | 2005/031807 | | 2/2005 |
| JP | 2005/521946 | | 7/2005 |
| JP | 2008-099055 | | 4/2008 |
| JP | 2010-256972 | | 11/2010 |
| RU | 2295752 | | 3/2007 |
| RU | 2298287 | | 4/2007 |
| RU | 2305860 | | 9/2007 |
| WO | 1998/058478 | | 12/1998 |
| WO | 2001/016724 | | 3/2001 |
| WO | 2002/009106 | | 1/2002 |
| WO | 2003/032569 | | 4/2003 |
| WO | 2003/083684 | | 10/2003 |
| WO | WO 2009/064375 | * | 5/2009 ............ G06F 7/588 |
| WO | 2010/060206 | | 6/2010 |
| WO | 2010/088768 | | 8/2010 |
| WO | 2010/127327 | | 11/2010 |
| WO | 2011/087545 | | 7/2011 |
| WO | 2013/024342 | | 2/2013 |
| WO | 2013/024343 | | 2/2013 |
| WO | 2013/109984 | | 7/2013 |
| WO | 2013/128284 | | 9/2013 |
| WO | 2013/153439 | | 10/2013 |

OTHER PUBLICATIONS

Search Report and Written Opinion, dated Nov. 16, 2015, received in connection with SG Application No. 2013087150.
Coffman, Daniel, et al., "A Client-Server Architecture for State-Dependent Dynamic Visualizations on the Web," IBM T.J. Watson Research Center, 2010, 10 pages.
Fraser, N., "Differential Synchronization," Google, Mountain View, CA, Jan. 2009, 8 pages.
Jourdain, Sebastien, et al., "ParaViewWeb: A Web Framework for 3D Visualization and Data Processing," International Journal of Computer Information Systems and Industrial Management Applications, vol. 3, 2011, pp. 870-877.
Microsoft Computer Dictionary, Microsoft Press, 5$^{th}$ Edition, Mar. 15, 2002, p. 624.

(56) References Cited

OTHER PUBLICATIONS

Mitchell, J. Ross, et al., A Smartphone Client-Server Teleradiology System for Primary Diagnosis of Acute Stroke, Journal of Medical Internet Research, vol. 13, Issue 2, 2011, 12 pages.
ParaViewWeb, KitwarePublic, retrieved on Jan. 27, 2014 from http://www.paraview.org/Wiki/ParaViewWeb, 1 page.
Remote Desktop Protocol (RDP), retrieved on May 4, 2014 from http://en.wikipedia.org/wiki/Remote_Desktop_Protocol, 7 pages.
Remote Desktop Services (RDS), Remote App, retrieved on May 4, 2014 from http://en.wikipedia.org/wiki/Remote_Desktop_Services, 9 pages.
Remote Desktop Services (RDS), Windows Desktop Sharing, retrieved on May 4, 2014 from http://en.wikipedia.org/wiki/Remote_Desktop_Serives, 9 pages.
Extended European Search Report, dated Jun. 2, 2014, received in connection with European Application No. 12760310.8.
Extended European Search Report, dated Mar. 3, 2015, received in connection with related European Application No. 09828497.9.
International Search Report, dated Feb. 19, 2010, in connection with International Application No. PCT/CA2009/001704.
International Preliminary Report on Patentability and Written Opinion, dated May 31, 2011, in connection with International Application No. PCT/CA2009/001704.
International Search Report, dated May 12, 2010, in connection with International Application No. PCT/CA2010/000154.
International Preliminary Report on Patentability and Written Opinion, dated Aug. 9, 2011, in connection with International Application No. PCT/CA2010/000154.
International Search Report and Written Opinion, dated Jul. 31, 2012, in connection with International Application No. PCT/IB2012/000562.
International Search Report, dated Dec. 20, 2012, in connection with International Application No. PCT/IB2012/001589.
International Preliminary Report on Patentability and Written Opinion, dated Feb. 18, 2014, in connection with International Application No. PCT/IB2012/001589.
International Search Report, dated Dec. 28, 2012, in connection with International Application No. PCT/IB2012/001590.
International Preliminary Report on Patentability and Written Opinion, dated Feb. 18, 2014, in connection with International Application No. PCT/IB2012/001590.
International Search Report and Written Opinion, dated Aug. 21, 2013, in connection with International Application No. PCT/IB2013/000676.
International Search Report and Written Opinion, dated Jul. 31, 2013, in connection with International Application No. PCT/IB2013/000720.
International Search Report and Written Opinion, dated Mar. 19, 2015, received in connection with International Application No. PCT/US2014/064243.
International Search Report and Written Opinion, dated Jun. 30, 2016, received in connection International Patent Application No. PCT/IB2016/000277.
"GTK 3, Broadway and an HTML5 websocket gui, for free," retrieved on Sep. 26, 2017 at http://compsci.ca/v3/viewtopic.php?t=36823, Apr. 12, 2014, pp. 1-3.

* cited by examiner

METHOD AND SYSTEM FOR PROVIDING A STATE MODEL OF AN APPLICATION PROGRAM

CROSS-REFERENCE TO RELATED APPLICATIONS

This application is a continuation of U.S. patent application Ser. No. 13/425,496, filed Mar. 21, 2012, and entitled "Method and System for Providing a State Model of an Application Program," and claims priority to U.S. Provisional Application No. 61/487,598, filed May 18, 2011, and entitled "Method and System for Providing a State Model of an Application Program," which are each incorporated herein by reference in its entirety.

BACKGROUND OF THE DISCLOSURE

Ubiquitous remote access to services, application programs and data has become commonplace as a result of the growth and availability of broadband and wireless network access. Remote access to application programs may be provided using a mobile device connected to a server computer via a computer network. Use of wireless handheld devices such as, for example, IPHONE, ANDROID, and IPAD has rapidly increased over the last couple of years to the extent that now many own at least one wireless handheld device. State of the art wireless mobile technology enables use of small wireless handheld devices to access the Internet and interact with various types of application programs.

Most computer applications used in, for example, large businesses, government organizations, and hospitals are still legacy mainframe computer applications run on a mainframe computer network. The original terminals have been replaced by Personal Computers (PCs) and terminal emulators enabling the PC user to interact with the mainframe computer application. However, to provide mobile devices with remote access to such programs, it is generally required that the source code of the mainframe computer application and/or the terminal emulator is modified in order to create an appropriate interface for the mobile device to interact with the legacy application. This can be expensive, time consuming and difficult to accomplish.

SUMMARY OF THE DISCLOSURE

According to an aspect of the present disclosure, there is provided a method for providing remote access to a legacy application program over a communication network. The method may include determining logical elements of the legacy application program; determining a state model in accordance with the logical elements of the legacy application program, the state model providing an association of logical elements of the legacy application program with corresponding states of the legacy application program; generating a remote access program in accordance with the state model, the remote access program executing on a server computing device; updating the state model in accordance with data received from a user interface program executing on a client computer and in accordance with application data received from the legacy application program; enabling communication between the legacy application program and a client computer; and providing application representation data generated in accordance with the application data to the user interface program to the client computer, the application representation data enabling the client computer to display a visualization of the legacy application program in accordance with information contained in the state model.

According to another aspect of the present disclosure, there is provided an apparatus for providing remote access to a legacy application over a communication network. The apparatus may include a network interface device that interfaces with the communication network, a memory that stores computer executable instructions, and a processor that executes the computer executable instructions. The instructions may cause the apparatus to determine logical elements of the legacy application program; determine a state model in accordance with the logical elements of the legacy application program, the state model providing an association of logical elements of the legacy application program with corresponding states of the legacy application program; generate a remote access program in accordance with the state model, the remote access program executing on a server computing device; update the state model in accordance with data received from a user interface program executing on a client computer and in accordance with application data received from the legacy application program; enable communication between the legacy application program and a client computer; and provide application representation data generated in accordance with the application data to the user interface program to the client computer, the application representation data enabling the client computer to display a visualization of the legacy application program in accordance with information contained in the state model.

According to another aspect of the present disclosure, there is provided a method for providing remote access to an application program. The method may include determining logical elements of the legacy program, the application program being executed on a first computer connected to the computer network; determining a state model of the legacy application program in accordance with the logical elements; and generating a remote access program at a server computer in accordance with the state model. The remote access program may perform updating the state model in accordance with input data received from a user interface program; generating control data in accordance with the updated state model and providing the control data to the legacy application program; updating the state model in accordance with application data received from the legacy application program; generating application representation data in accordance with the updated state model; and providing the application representation data to the user interface program to provide a visualization of the legacy application program in accordance with information contained in the state model.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DESCRIPTION OF THE IMPLEMENTATIONS

Unless defined otherwise, all technical and scientific terms used herein have the same meaning as commonly understood by one of ordinary skill in the art to which the disclosure belongs. As will become evident to those of ordinary skill in the art, methods and materials similar or equivalent to those described herein can be used in the practice or testing of the present disclosure. As will be appreciated from the present disclosure, implementations will be described for enabling remote access to a mainframe application computer program via a computer network absent source code modification of the mainframe computer application and/or the terminal emulator.

Figure 1:
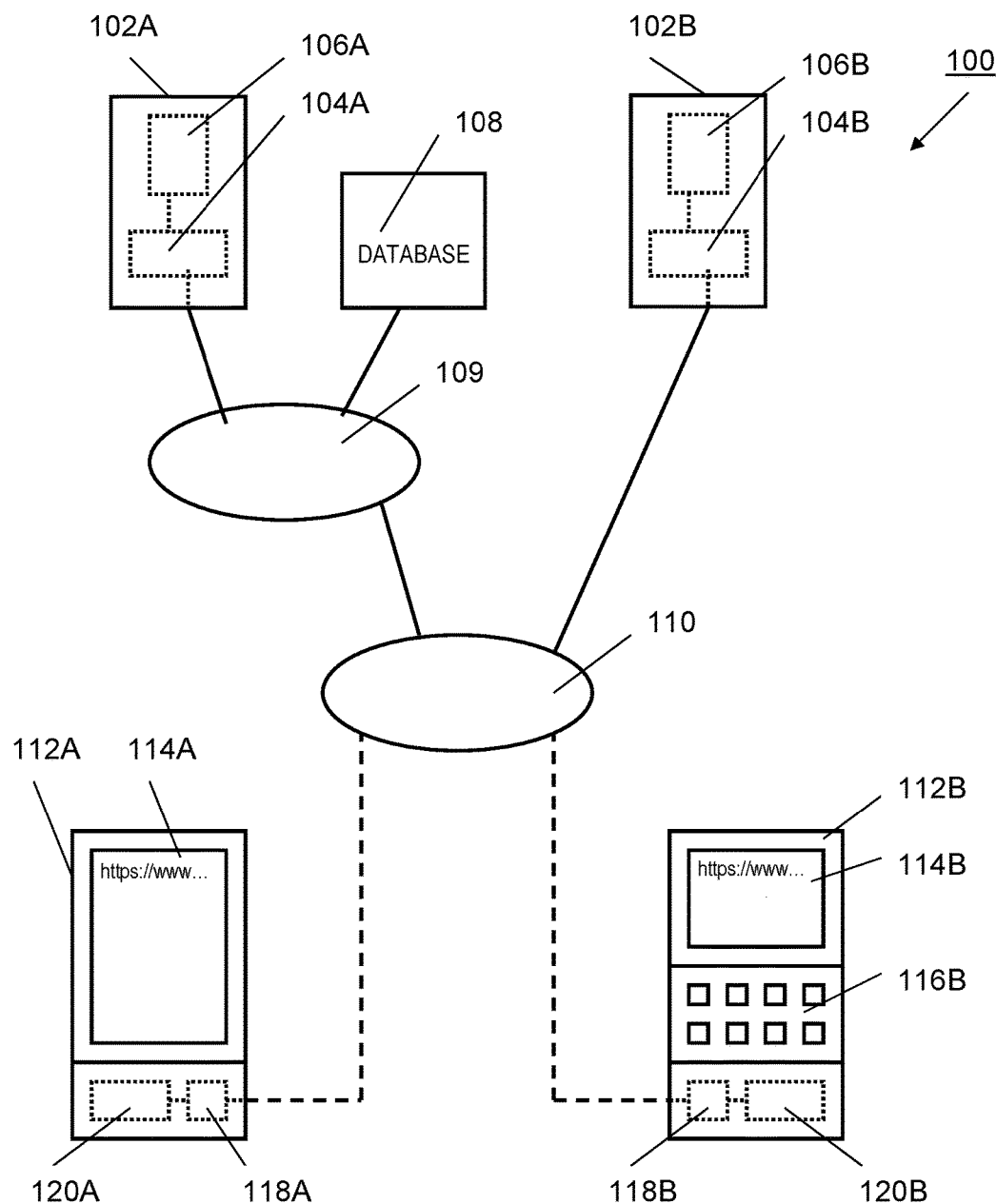
FIG. 1 is a simplified block diagram illustrating a system for providing remote access to an application program from a client computer via a computer network according to an implementation of the disclosure.

Referring to FIG. 1, there is illustrated a system 100 for providing remote access to an application program via a computer network according to an implementation of the disclosure. The system comprises a client computer 112A or 112B, e.g., a wireless handheld device such as, for example, an IPHONE 112A or a BLACKBERRY 112B connected via a computer network 110 such as, for example, the Internet, to server computer 102B. The client computer may be a mobile device (e.g., a smartphone, a tablet device, a notebook/laptop computer), a desktop computer (e.g., a personal computer executing MICROSOFT WINDOWS, MAC OS, Linux) or workstation.

The server computer 102B may be connected, for example, via the computer network 110 to a Local Area Network (LAN) 109. For example, the LAN 109 may be an internal computer network of an institution such as a hospital, a bank, a large business, or a government department. Typically, such institutions still use a mainframe computer 102A and a database 108 connected to the LAN 109, as these legacy systems provide numerous services to the institution. Numerous application programs are performed, for example, by executing on processor 104A executable commands of the respective application program stored in memory 106A of the mainframe computer 102A. The original terminals connected to the mainframe computer 102A via the LAN 109 and used to interact with the mainframe computer 102A have been replaced with Personal Computers (PCs). Remote access to the application program executed on the mainframe computer 102A is then provided using terminal emulator programs, typically executed on the PCs.

Figure 2A:
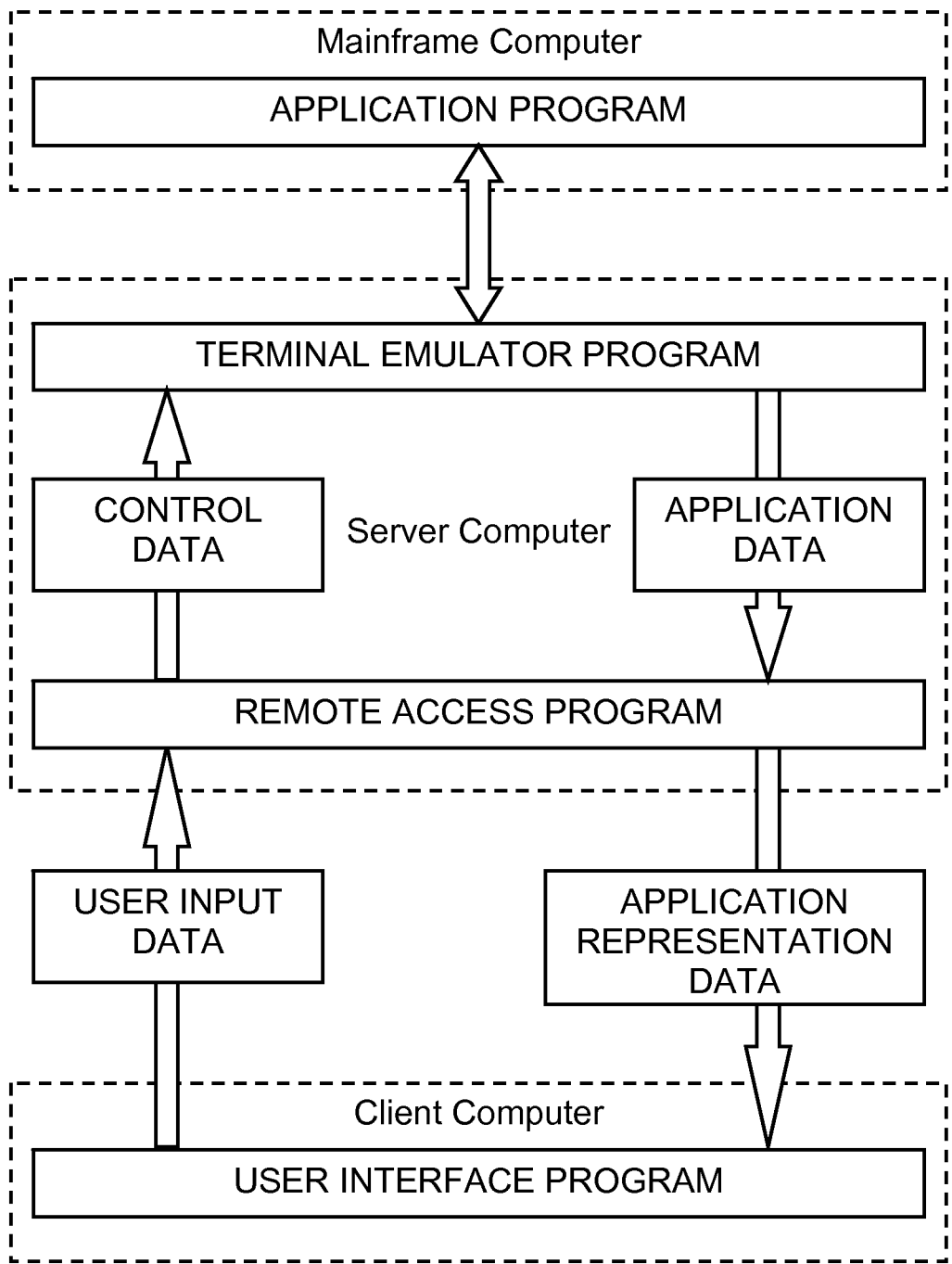
FIG. 2a is a simplified block diagram illustrating communication of the client computer with an application program using the system shown in FIG. 1.

According to some implementations, remote access to the application program using, for example, a handheld wireless device 112A, 112B is provided by executing a remote access program or application on processor 104B of the server computer 102B which is in communication with a respective terminal emulator program executed using, for example, the processor 104B of the server computer 102B. Communication between the client computer 112A or 112B and the server computer 102B may be provided as communication between the remote access program or application and a user interface program or client remote access application via, for example, a wireless computer network, as illustrated in FIG. 2a. The user interface program or client remote access application may be designed for providing user interaction via a hand-held wireless device for displaying data in a human comprehensible fashion and for determining user input data in accordance with received user instructions for interacting with the application program using, for example, a graphical display with touch-screen 114A or a graphical display 114B and a keyboard 116B of the handheld wireless device 112A, 112B, respectively.

The user interface program or client remote access application may be performed by executing executable commands on processor 118A, 118B of the client computer 112A, 112B with the commands being stored in memory 120A, 120B of the client computer 112A, 112B, respectively. For example, the user interface program or client remote access application is performed by executing executable commands on processor 118A, 118B of the client computer 112A, 112B with the commands being stored in memory 120A, 120B of the client computer 112A, 112B, respectively. Alternatively, the user interface program or client remote access application is executed on the server computer 102B which is then accessed via an URL by a generic client application such as, for example, a web browser executed on the client computer 112A, 112B. The user interface is implemented using, for example, Hyper Text Markup Language HTML 5.

The remote access program or application may determine control data in accordance with the user input data received from the user interface program or client remote access application and provides the same to the terminal emulator program. The terminal emulator program is in communication with the application program executed on the mainframe computer 102A. Data generated by the application program are then provided via the terminal emulator program as application data to the remote access program or application, which generates application representation data in dependence thereupon and provides the same to the user interface program or client remote access application for display. For example, the remote access program or application and the terminal emulator program are executed using the processor 104B of the server computer 102B connected to the LAN 109 via computer network 110, as illustrated in FIGS. 1 and 2a. Alternatively, the remote access program or application and the terminal emulator program are executed using the processor 104a of the mainframe computer 102A or a processor of a computer in communication with the mainframe computer 102A via the LAN 109. Further alternatively, the remote access program or application is executed using the processor 118A, 118B of the client computer 112A, 112B, respectively.

Figure 2B:
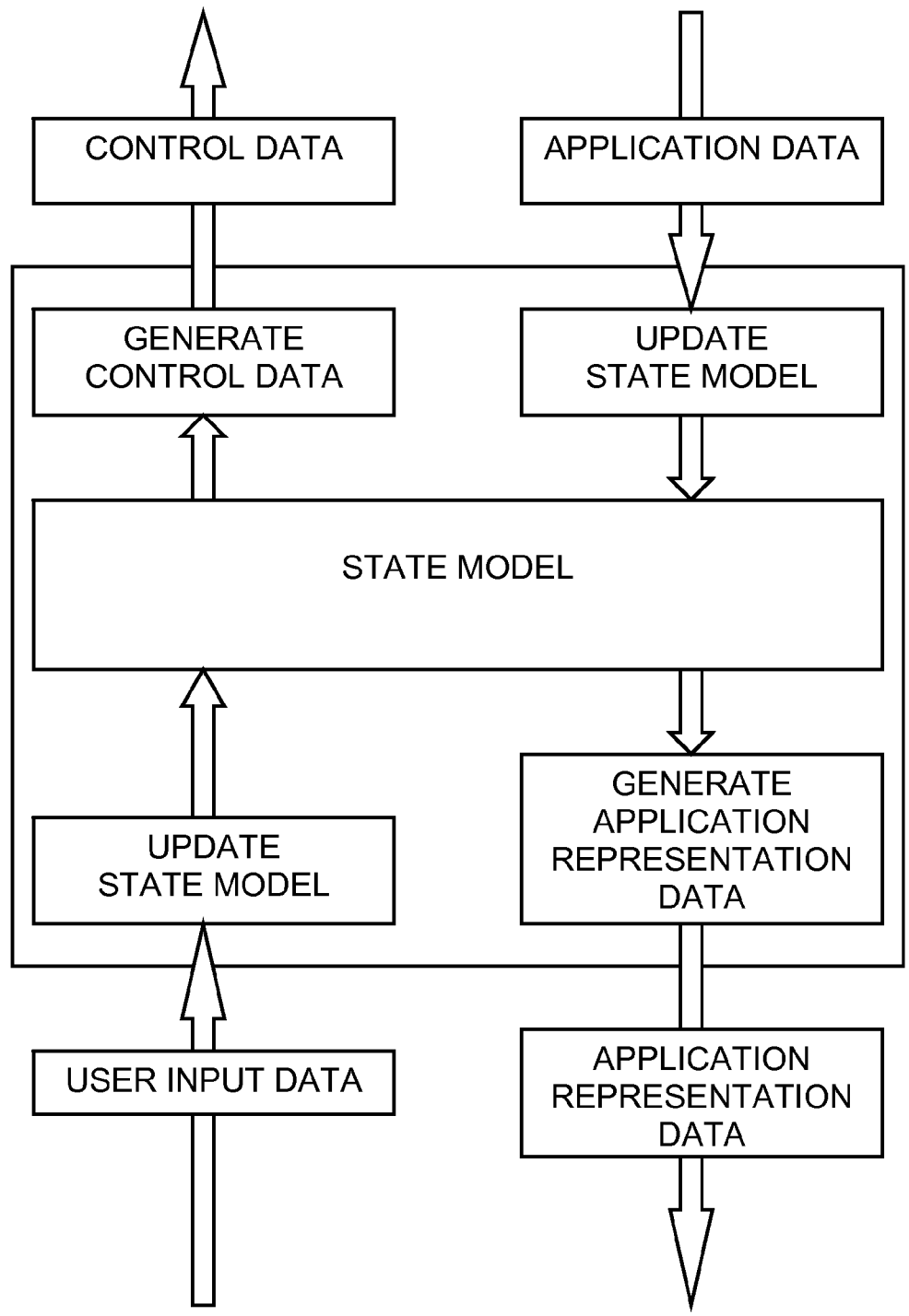
FIG. 2b is a simplified block diagram illustrating operation of the remote access program or application according to an implementation of the disclosure.

The operation of the remote access program or application may be performed in accordance with a state model of the application program, as illustrated in FIG. 2b. When executed, the remote access program or application updates the state model in accordance with user input data received from a user interface program or client remote access application, generates control data in accordance with the updated state model, and provides the same to the application program via the terminal emulator program. Upon receipt of application data from the terminal emulator program, the remote access program or application updates the state model in accordance with the application data received from the application program, generates application representation data in accordance with the updated state model, and provides the same to the user interface program or client remote access application. The state model comprises an association of logical elements of the application program with corresponding states of the application program, where the logical elements may be in a hierarchical order. The state model may be determined such that each of the logical elements is associated with a corresponding state of the application program. Further, the state model is determined such that the logical elements are associated with user interactions. For example, the logical elements of the application program are determined such that the logical elements comprise transition elements with each transition element relating a change of the state model to one of control data and application representation data associated therewith.

Table 1, below, illustrates an example section of a state model of an application program for purchasing a ticket. The state model may be represented in an Extensible Markup Language (XML) document. Other representations of the state model are contemplated, such as, but not limited to, a binary file, a data structure, etc. Different states of the application program associated with different screens related to different stages of the ticket purchasing process, such as, for example, main menu, ticket customer entry, etc., are defined, as well as transitions between the different states and the related triggers. For example, for each state one or more "fields" are defined for receiving user input data and displaying the same, as illustrated in Table 1 for the main menu.

TABLE 1

```
<ApplicationState>
<Screens>
    <Screen id="0" name="main menu">
      <Fields>
        <Field name="name" description="Customer name" default="">
          <Type fieldType="Text" maxChars="128" />
          <Validation />
        </Field>
      </Fields>
    </Screen>
    <Screen id="1" name="ticket customer entry" />
    <Screen id="2" name="ticket customer choice" />
    <Screen id="3" name="ticket customer payment" />
    <Screen id="4" name="ticket customer payment accepted" />
    <Screen id="5" name="ticket customer payment declined" />
</Screens>
  <NavModel>
    <Transition sourceId="0" destId="1" trigger="Key_1" />
    <Transition sourceId="1" destId="0" trigger="Key_ESC" />
    <Transition sourceId="3" destId="5" trigger="server" />
    <Transition sourceId="5" destId="3" trigger="Key_ESC" />
  </NavModel>
  <ScreenData>
    <CurrentScreen id="0" />
    <Screen id="0">
    <Value field="name">John Miller</Value>
    </Screen>
  </ScreenData>
</ApplicationState>
```

Figure 3:
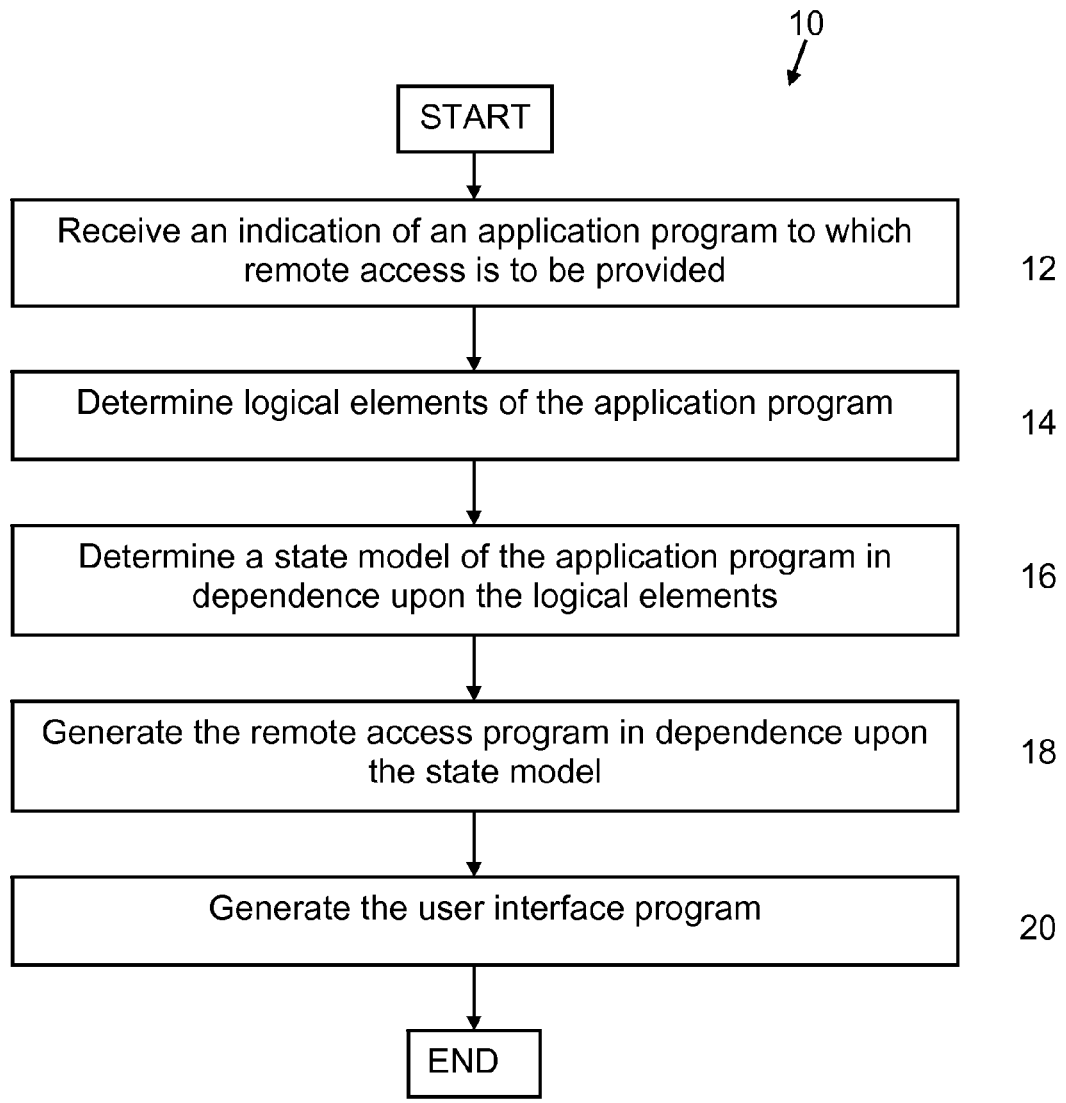
FIG. 3 is a simplified flow diagram illustrating generation of the remote access program or application according to an implementation of the disclosure.

Referring to FIG. 3, there is illustrated a flow diagram 10 of an example method for generating a remote access program or application according to an implementation of the disclosure. At 12, an indication is received of application program to which remote access is to be provided by a development program. For example, a file browser of a "Choose Application" tool of the development program may be provided to a user. The development program may be software development kit, such as that included with PUREWEB, available from Calgary Scientific, Inc., Calgary, Alberta, Canada. At 14, the logical elements of the application program are then determined for example, by launching the application program. Alternatively, the logical elements are provided from a database. At 16, a state model of the application program is the determined in accordance with the logical element, for example, by creating a hierarchical representation of the user interface elements, assigning each a unique ID, and labeling each element.

At 18, the development program then generates the remote access program or application in accordance with the state model, for example, in the form of executable XML commands. At 20, the user interface program or client remote access application is generated to interact with the remote access program or application. The user interface program or client remote access application is generated using standard application tools such as, for example, Microsoft Silverlight. The development program is performed for example, by executing executable commands stored in a storage medium on a processor using, for example, the processor 104B of the server computer 102B. Alternatively, the development is performed using a computer in communication with the server computer 102B via the computer network 110.

In accordance with some implementations, the development program, the remote access program or application and the user interface program or client remote access application are implemented using standard programming tools such as, for example, Extensible Markup Language (XML), Microsoft Foundation Class (MFC) applications, Remote Desktop Protocol (RDP), Adobe Flash and Microsoft Silverlight. In accordance with some implementations, communication is enabled using standard communication technologies such as, for example, Hyper Text Transfer Protocol (HTTP), virtual private networks (VPN), and secure socket layers (SSL) which are well known to those skilled in the art. Optionally, the terminal emulator program may be omitted if communication with the application program is enabled using, for example, RDP or MFC applications.

The present disclosure has been described herein with regard to preferred implementations. However, it will be obvious to persons skilled in the art that a number of variations and modifications can be made without departing from the scope of the disclosure as described herein.

What is claimed:

1. A server-based method for providing remote access to a legacy application program over a communication network, comprising:
   determining logical elements of the legacy application program in accordance with corresponding states of the legacy application program;
   determining a state model in accordance with the logical elements of the legacy application program, the state model associating the logical elements of the legacy application program with the corresponding states of the legacy application program;
   generating a remote access program in accordance with the state model, the remote access program executing on a server computing device;
   updating the state model in accordance with data received from a user interface program executing on a client computer and in accordance with application data received from the legacy application program;
   enabling communication between the legacy application program and the client computer; and
   providing application representation data generated in accordance with the application data to the user interface program to the client computer, the application representation data enabling the client computer to display the legacy application program in accordance with information contained in the state model.

2. The method of claim 1, further comprising determining the logical elements by launching the legacy application program.

3. The method of claim 1, further comprising determining the logical elements by accessing a database and retrieving the logical elements.

4. The method of claim 1, further comprising representing the logical elements in a hierarchical representation of user interface elements.

5. The method of claim 1, further comprising representing the logical elements in an Extensible Markup Language (XML) document.

6. The method of claim 1, wherein the logical elements are associated with user interactions.

7. The method of claim 6, wherein the logical elements comprise transition elements, and wherein each transition element relates a change of the state model to one of control data and application representation data associated therewith.

8. The method of claim 1, further comprising providing access to the user interface program accessible at a Uniform Resource Locator (URL).

9. The method of claim 1, further comprising:
receiving an input at the user interface program;
updating the state model at the remote access program in accordance with the input and generating control data; and
providing control data to the legacy application.

10. An apparatus for providing remote access to a legacy application program over a communication network, comprising:
a network interface device that interfaces with the communication network;
a memory that stores computer executable instructions; and
a processor that executes the computer executable instructions to:
determine logical elements of the legacy application program in accordance with corresponding states of the legacy application program;
determine a state model in accordance with the logical elements of the legacy application program, the state model associating the logical elements of the legacy application program with the corresponding states of the legacy application program;
generate a remote access program in accordance with the state model, the remote access program executing on a server computing device;
update the state model in accordance with data received from a user interface program executing on a client computer and in accordance with application data received from the legacy application program;
enable communication between the legacy application program and the client computer; and
provide application representation data generated in accordance with the application data to the user interface program to the client computer, the application representation data enabling the client computer to display the legacy application program in accordance with information contained in the state model.

11. The apparatus of claim 10, wherein the logical elements are determined by launching the legacy application program.

12. The apparatus of claim 10, wherein the logical elements are determined by accessing a database and retrieving the logical elements.

13. The apparatus of claim 10, wherein the logical elements are represented in a hierarchical representation of user interface elements.

14. The apparatus of claim 10, further comprising representing the logical elements in an Extensible Markup Language (XML) document.

15. The apparatus of claim 10, wherein the logical elements are associated with user interactions.

16. The apparatus of claim 15, wherein the logical elements comprise transition elements, and wherein each transition element relates a change of the state model to one of control data and application representation data associated therewith.

17. The apparatus of claim 10, further comprising providing access to the user interface program accessible at a Uniform Resource Locator (URL).

18. The apparatus of claim 10, wherein the state model is updated in accordance with an input received at the user interface program, wherein the state model is updated at the remote access program in accordance with the input to generate control data, and wherein the control data is provided to the legacy application.

19. A method for providing remote access to a legacy application program via a computer network comprising:
determining logical elements of the legacy program in accordance with corresponding states of the legacy application program, the legacy application program being executed on a first computer connected to the computer network;
determining a state model that associates the logical elements of the legacy application program with the corresponding states of the legacy application program; and
generating a remote access program at a server computer in accordance with the state model, the remote access program:
updating the state model in accordance with input data received from a user interface program;
generating control data in accordance with the updated state model and providing the control data to the legacy application program;
updating the state model in accordance with application data received from the legacy application program;
generating application representation data in accordance with the updated state model; and
providing the application representation data to the user interface program to display the legacy application program in accordance with information contained in the state model.

20. The method of claim 19, wherein the logical elements are associated with user interactions.

* * * * *

UNITED STATES PATENT AND TRADEMARK OFFICE
CERTIFICATE OF CORRECTION

PATENT NO. : 10,158,701 B2  
APPLICATION NO. : 14/609634  
DATED : December 18, 2018  
INVENTOR(S) : Pierre Joseph Lemire et al.

Page 1 of 1

It is certified that error appears in the above-identified patent and that said Letters Patent is hereby corrected as shown below:

On the Title Page

Column 1, item (63) under Related U.S. Application Data, cancel the text beginning with "Continuation of" and ending "Pat. No. 8,949,378." and insert the following language:
--Continuation of U.S. Patent Application No. 13/425,496, filed on March 21, 2012, now Pat. No. 8,949,378, which claims priority to U.S. Provisional Application Number 61/487,598, filed May 18, 2011.--

Signed and Sealed this
Twelfth Day of February, 2019

Andrei Iancu
*Director of the United States Patent and Trademark Office*